United States Patent
Bisson et al.

(10) Patent No.: US 10,259,652 B1
(45) Date of Patent: Apr. 16, 2019

(54) DEBRIS DISPOSAL CHUTE

(71) Applicant: Garlock Equipment Company, Plymouth, MN (US)

(72) Inventors: Christopher Scott Bisson, Lambertville, MI (US); Robert James Olson, Medina, MN (US)

(73) Assignee: Garlock Equipment Company, Plymouth, MN (US)

( * ) Notice: Subject to any disclaimer, the term of this patent is extended or adjusted under 35 U.S.C. 154(b) by 78 days.

(21) Appl. No.: 15/587,431

(22) Filed: May 5, 2017

Related U.S. Application Data

(60) Provisional application No. 62/332,548, filed on May 6, 2016.

(51) Int. Cl.
*B65G 11/08* (2006.01)
*B65G 11/10* (2006.01)
*B65G 11/18* (2006.01)

(52) U.S. Cl.
CPC .......... *B65G 11/186* (2013.01); *B65G 11/083* (2013.01); *B65G 11/10* (2013.01)

(58) Field of Classification Search
CPC ..... B65G 11/00; B65G 11/106; B65G 11/186; B65G 11/026
USPC ..... 193/14, 15, 24, 25 E, 25 C, 34, 2 A, 2 R
See application file for complete search history.

(56) References Cited

U.S. PATENT DOCUMENTS

| | | | | | |
|---|---|---|---|---|---|
| 1,185,459 | A | * | 5/1916 | Worley | F16L 11/18 138/120 |
| 3,949,850 | A | * | 4/1976 | Schumm | B65G 11/083 193/16 |
| 4,640,403 | A | * | 2/1987 | McDermott | E04F 17/12 193/34 |
| 5,127,507 | A | * | 7/1992 | McDermott | B65G 11/186 193/17 |
| 7,089,642 | B2 | * | 8/2006 | Grata | B65G 11/083 138/97 |
| 7,472,779 | B2 | * | 1/2009 | Boustani | B65G 11/083 193/2 A |
| 7,971,698 | B2 | * | 7/2011 | Burstrom | B65G 11/146 193/25 C |

* cited by examiner

*Primary Examiner* — James R Bidwell
(74) *Attorney, Agent, or Firm* — Alan D. Kamrath; Kamrath IP Lawfirm, P.A.

(57) ABSTRACT

A debris disposal chute includes a plurality of tubes having rectangular cross sections of a decreasing size attached together. Flaccid members are connected between hangers pivotably mounted to a casing and the first tube and between the flaccid members of the upper tube and the next lower tube. The casing is pivotably mounted to a receptacle about an axis perpendicular to the hanger axis and the center line of the chute. A header is removably connected to the receptacle by attachment bars and includes a surface inclined towards the open entry. Weight basins are removably connected to the header by leverage connectors on opposite sides of the open entry and the attachment bars.

21 Claims, 2 Drawing Sheets

DEBRIS DISPOSAL CHUTE

BACKGROUND

A chute for disposing debris especially for tear-off from re-roofing operations is shown and described.

In many re-roofing operations, existing roofing material is removed from the roof of a building and must be placed in a dumpster located at ground level next to the building. One manner of disposing such debris is a chute having interconnected cylinders of circular cross sections. However, such conventional chutes suffered from a variety of disadvantages. As examples, when the lower ends of conventional chutes are pulled away from the building for placement in a dumpster, conventional chutes take on a "J" shape with a tight curve near the lower end, and debris falling down the chute wears away the chutes in the area of the tight curve. Also, it is often necessary for the roofer to "hand-pick" pieces of debris and feed them down the conventional chute, thereby slowing down the operation and also requiring the roofer to be in closer proximity to the roof edge.

With long standing labor shortages in the roofing industry, material handling efficiency (moving more material in less time) has become increasingly important to roofing contractors. Thus, a need exists for a chute for disposing debris especially for tear-off from roofing operations which overcomes the problems and shortcomings encountered by conventional chutes.

SUMMARY

This need and other problems in the field of debris removal is solved by providing a debris disposal chute. Particularly, a plurality of tubes having cross sections, illustrated as being rectangular, of a decreasing size is attached together with the upper end of the first tube received in the open bottom end of a casing and with the lower end of the upper tube received in the upper end of the lower tube. Flaccid members are connected between the first tube and the casing, and flaccid members are connected between the lower tube and the flaccid members connected to the upper tube.

In illustrated aspects, hangers are pivotably mounted on opposite sides of the open bottom end of the casing about an axis perpendicular to the center line, with the flaccid members connected to the first tube being connected to the hangers.

In illustrated aspects, removable weights are received in first and second weight basins located on opposite sides of the open entry of the chute and connected thereto by leverage connectors formed of multiple components connected together and removably connected in sockets of the weight basins and to the casing.

In illustrated aspects, a header includes an inclined surface at a decreasing angle to horizontal approaching the open entry of the chute and a pair of guard rails upstanding therefrom and located on opposite sides of the inclined surface. In illustrated forms, attachment bars removably connected to the casing are removably connected to sockets in the header on opposite sides of the inclined surface. Similarly, the leverage connectors of the weight basins are removably connected to sockets located parallel to and outwardly of the attachment bars.

In illustrated aspects, the open top end of the casing receives the open exit of a receptacle, with the casing pivotably mounted to the receptacle about a receptacle axis which is perpendicular to the axis of the hangers and the center line. The receptacle includes an end plate extending downwardly from the open entry and simultaneously extending from the open entry away from the header, with the end plate having linear portions interspersed with isosceles triangle shaped portions extending parallel to and spaced from the open entry.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
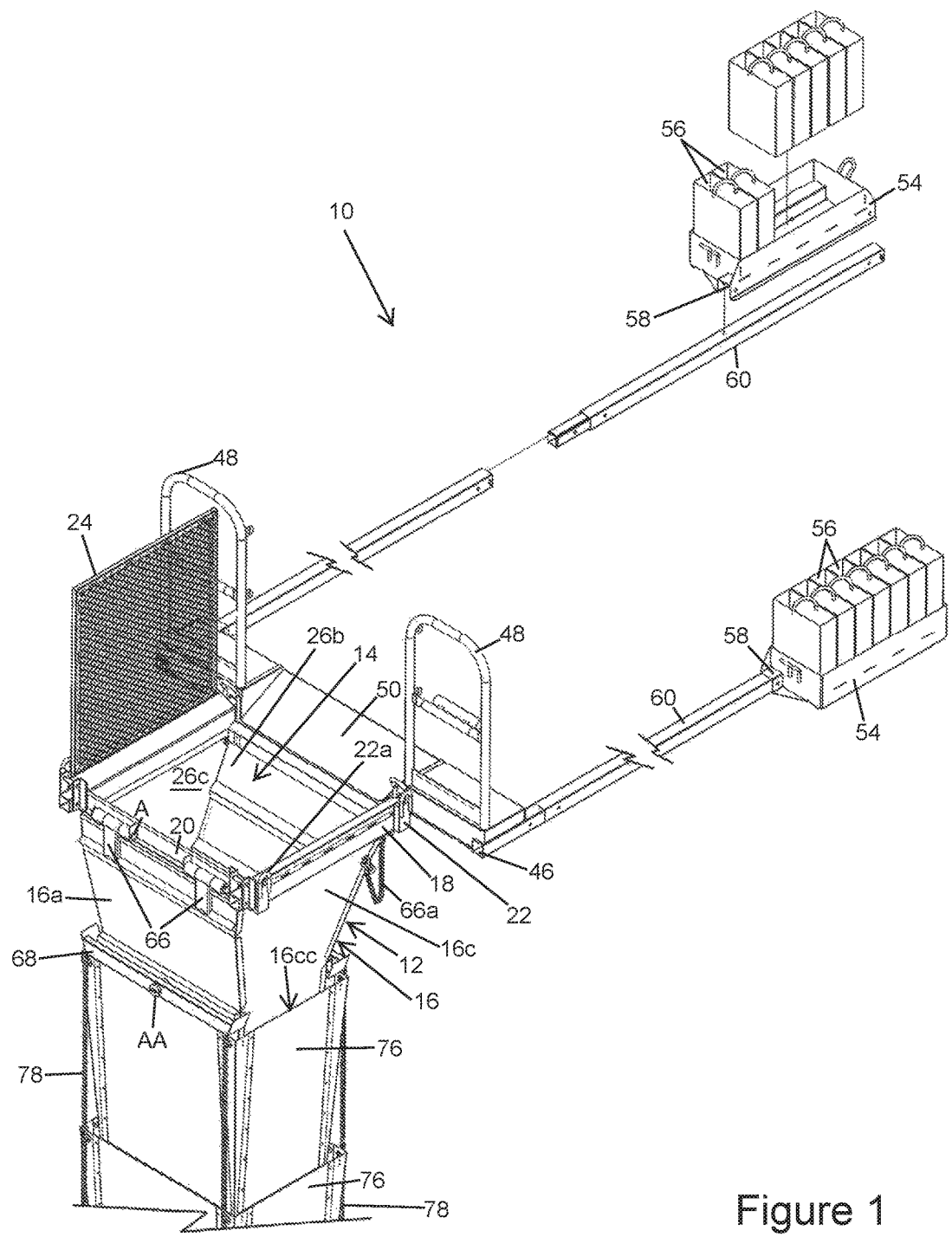
FIG. 1 shows an exploded, perspective view of a debris disposal chute, with portions broken away.
Figure 2:
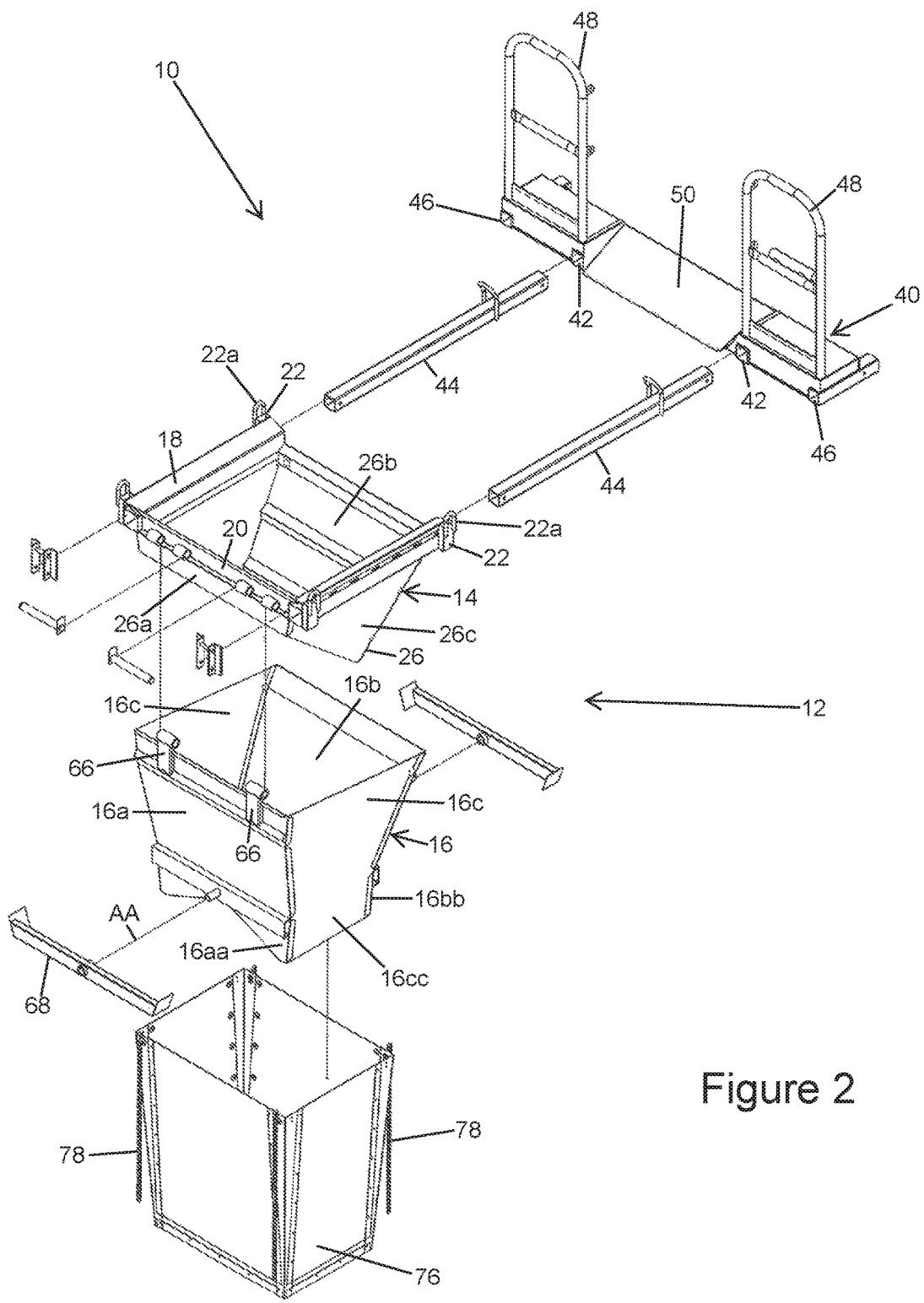
FIG. 2 shows a partial, exploded, perspective view of the debris disposal chute of FIG. 1.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A chute for disposing debris especially for tear-off from re-roofing operations is shown in the drawings and generally designated 10. Particularly, chute 10 includes a hopper 12 shown as including a receptacle 14 and a casing 16 pivotally mounted thereto. Receptacle 14 is of a tubular shape having an open entry and an open exit. Receptacle 14 generally includes a frame including first and second, tubular, spaced frame sides 18 interconnected by a frame end 20. A pair of tubular sockets 22 is connected to each frame side 18 for slideably receiving posts of screens 24 arranged in a U-shape extending generally upwardly from frame sides and end 18 and 20 defining the open entry, with only one screen 24 being shown for ease of illustration. Lift loops 22a are connected to sockets 22 opposite to frame sides 18 and for removable attachment of lift cables for placing chute 10 on a roof. Receptacle 14 further includes a sleeve 26 of generally rectangular cross sections depending therefrom. In particular, sleeve 26 includes a first end plate 26a extending generally downward from frame end 20, a second end plate 26b extending downwardly from the ends of frame sides 18 opposite to the frame end 20 at an angle towards end plate 26a, and third and fourth, spaced, parallel side plates 26c extending downwardly from frame sides 18 and extending between side plates 26a and 26b. In the form shown, first plate 26a is planar and of a rectangular shape, third and fourth plates 26c are planar and of a triangular shape, and second plate 26b is of a rectangular shape and includes cross sections parallel to third and fourth plates 26a including linear portions interspersed with isosceles triangle shaped portions for reinforcement and which help separate debris passing through receptacle 14. A spring biased latch is located on second plate 26b intermediate third and fourth side plates 26c and opposite to first plate 26a.

Chute 10 further includes a header 40 including first and second sockets 42 of a size and shape corresponding to sockets 22. A pair of attachment bars 44 is of a size and shape for slideable receipt simultaneously into sockets 22 and 42 for removably interconnecting header 40 to receptacle 14. Header 40 further includes third and fourth sockets 46 parallel to and spaced outwardly from sockets 42. Header 40 further includes a pair of guard rails 48 upstanding therefrom to an extent generally equal to that of screens 24 and generally between sockets 42 and 46. Header 40 also includes an inclined surface 50 extending between sockets 42 and generally at a decreasing angle to the horizontal approaching receptacle 14 and casing 16 from the first surface to the rear surface thereof in contact with receptacle 14.

Chute 10 further includes first and second weight basins 54 each adapted to removably receive multiple weight blocks 56. Each weight basin 54 includes a socket 58 of a size and shape corresponding to sockets 46 and shown as having U-shaped cross sections. Leverage connectors 60 are of a size and shape for slideable receipt simultaneously into sockets 46 and 58 for removably interconnecting header 40 (and receptacle 14 and casing 16 attached thereto) and weight basins 54. Leverage connectors 60 are formed of multiple components of a length that can be easily handled and transported and which are connected together in a contiguous and serial manner. Chute 10 can be placed on a flat surface such as a roof with leverage connectors 60 and first and second weight basins 54 abutting the flat surfaces on opposite sides of the open entry of receptacle 14 and casing 16, with second plate 26b closely adjacent and parallel to and possibly abutting with an edge of the flat surface, and with weight basins 56 supported upon the surface spaced from header 40 by leverage connectors 60.

Casing 16 is of a tubular shape having generally rectangular cross sections of a size and shape and defining an open top end for receiving sleeve 26 and an open bottom end. In particular, casing 16 includes a first frusto-shaped portion including a first end plate 16a of a generally rectangular shape, a second end plate 16b of a generally rectangular shape, and third and fourth plates 16c extending between plates 16a and 16b and generally of a trapezoidal shape. Casing 16 further includes a second rectangular-shaped portion including first and second end plates 16aa and 16bb of a rectangular shape and in a spaced parallel relation and third and fourth plates 16cc of a rectangular shape, in a spaced parallel relation, and extending between and interconnected to first and second plates 16aa and 16bb. Plates 16c, 16aa, 16bb and 16cc are planar. Plates 16a and 16b are generally planar but have cross sections parallel to plates 16c which include first and second planar portions at a large obtuse angle to each other. Plate 16b extends towards plate 16a from the free edge thereof towards plate 16bb. Casing 16 is pivotally mounted outside of and to receptacle 14 about an axis A defined by hinges 66 attached to frame end 20 and plate 16a and extending perpendicular to the center line of receptacle 14 and casing 16. Pivoting of casing 16 relative to receptacle 14 about axis A extends casing 16 at an angle outwardly of the building. A chain 66a is provided to limit the extent of pivotal movement of casing 16 relative to receptacle 14. Plate 16b can be slid under the spring biased latch on second plate 26b to hold casing 16 in that pivotal position relative to receptacle 14 for transport and storage. Hangers 68 are pivotally attached intermediate their ends to plates 16a and 16b of casing 16 about an axis AA spaced from and perpendicular to axis A and perpendicular to the center line of receptacle 14 and casing 16 and to axis A. A chain attachment loop is located at each of two, opposite connector ends of hanger 68.

Chute 10 further includes a plurality of tubes 76 having rectangular cross sections perpendicular to their center lines of a decreasing size, with each tube 76 being of size and shape for slideably receiving the open bottom end of casing 16 defined by plates 16aa, 16bb and 16cc and/or the lower end of an upper tube 76. Each tube 76 includes four flaccid members 78 for removable connection to chain attachment loops of hangers 68 of casing 16. Due to the pivotal attachment of hangers 68 to which flaccid members 78 are attached and the ability to attach flaccid members 78 at different lengths, the center line having a two axis configuration of chute 10 allows chute 10 to be aligned with the dumpster without binding. While flaccid members 78 of the first tube 76 are connected to hangers 68, flaccid members 78 of the second and subsequent tubes 76 are connected to flaccid members 78 of the previous tube 76.

Now that the basic construction of chute 10 has been explained, the operation and some of the features providing synergistic results can be highlighted. First, cross sections of chute 10 including hopper 12, casing 16 and tubes 76 are rectangular to provide a dumping width and overall area which accepts debris piled higher into a dump tray. Specifically, the dumping width of chute 10 more closely matches the width of most dumping trays used by roofers. Further, rectangular cross sections allow more debris to pass through than through a conventional chute having round cross sections of a diameter similar to the dumping width of chute 10, avoiding the requirement of "hand-picking" pieces of the debris. Thus, chute 10 allows for disposal of tear-off from re-roofing operations in less time and fewer trips between point of pick up and the location of hopper 12. Also, the form and arrangement of receptacle 14 and casing 16 help to separate large stacks of debris, to reduce plugging of chute 10. The center line having a two axis configuration of receptacle 14, casing 16 and tubes 76 keeps chute 10 aligned without binding that can cause curving. Thus, tubes 76 can be pulled out from the building and/or to either side aligning the opening of the lower tube 76 to be positioned over the dumpster without chute 10 setting into a curve. The lack of curving decreases time that the debris remains in chute 10 and eliminates impact at tight curves which results in wear.

Chute 10 is formed of a plurality of components which are removably interconnected into individual components which can be readily stored and transported. Specifically, individual components can be easily transported to the surface such as being carried by the roofers inside of elevators of the building or being lifted by a crane. Once on the surface, the components can be attached together and placed on the building for use. After completion of the operation where chute 10 is needed, the procedure can simply be reversed to disassemble the components and transport the disassembled components back to ground level.

Chute 10 formed of a plurality of components arranged as shown and described is believed to produce synergistic results. However, it should be appreciated that such components are capable of being utilized individually and/or in other combinations to achieve the functions and advantages in chutes of other types and forms.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Chute comprising, in combination:
a casing of a tubular shape having an open top end and an open bottom end;
a first tube having a first end and a second end opposite to the first end, with the open bottom end of the casing received in the first end of the first tube;
first flaccid members connected between the casing and the first tube;
a second tube having a third end and a fourth end opposite to the third end, with the second end of the first tube received in the third end of the second tube;
second flaccid members connected between the first flaccid members and the second tube; and
first and second hangers pivotably mounted on opposite sides of the open bottom end of the casing, wherein the first and second tubes each have a center line extending between the first and second ends and the third and fourth ends, respectively, with the first and second hangers pivotably mounted about a casing axis generally perpendicular to the center line of the first tube, with the first flaccid members connected to the first and second hangers.

2. The chute of claim 1, wherein cross sections of the first and second tubes perpendicular to the center line are rectangular of decreasing size from the first end to the second end and from the third end to the fourth end respectively.

3. The chute of claim 1, wherein each hanger has opposite connector ends, wherein the first flaccid members comprises four flaccid members having first member ends removably connected to the opposite connector ends of the first and second hangers and having second member ends connected to the first tube respectively.

4. The chute of claim 1, wherein each hanger has opposite connector ends, wherein the first flaccid members comprises four flaccid members having first member ends removably connected to the opposite connector ends of the first and second hangers and having second member ends connected to the first tube respectively.

5. The chute of claim 4, further comprising, in combination: a receptacle of a tubular shape having an open entry and an open exit, wherein the casing is pivotably mounted to the receptacle about a receptacle axis extending perpendicular to the casing axis and a center line of the casing and located outside of the receptacle.

6. The chute of claim 5, further comprising, in combination: first and second weight basins located on opposite sides of the open entry of the receptacle, with the first and second weight basins including first and second sockets of an inverted U-shaped cross section; first and second leverage connectors formed of multiple components connected together contiguously in a serial manner, with the first and second leverage connectors removably connected in the first and second sockets of the first and second weight basins; and weight blocks removably received in the first and second weight basins, with the first and second leverage connectors removably connected to the receptacle.

7. The chute of claim 6, further comprising, in combination: a header including third and fourth sockets, with the first and second leverage connectors removably connected in the third and fourth sockets opposite to the first and second weight basins, with the header removably connected to the receptacle, with the header including an inclined surface at a decreasing angle to horizontal approaching the receptacle, and with the header further including a pair of guard rails upstanding therefrom and located on opposite sides of the inclined surface.

8. The chute of claim 7, further comprising, in combination: first and second attachment bars, wherein the header includes fifth and sixth sockets located intermediate and parallel to the third and fourth sockets and on opposite sides of the inclined surface, wherein the receptacle includes seventh and eighth sockets, and wherein the first and second attachment bars are removably connected in the fifth and seventh sockets and in the sixth and eighth sockets respectively.

9. The chute of claim 8, wherein the receptacle includes a first end plate extending downwardly from the open entry, with the receptacle axis located outside and parallel to the first end plate, a second end plate extending downwardly from the open entry and extending from the open entry at an angle towards the first end plate, and third and fourth, spaced, parallel side plates extending downwardly from the open entry and between the first and second end plates.

10. The chute of claim 9, further comprising, in combination: a screen extending upwardly from the open entry of the receptacle to a height corresponding to the pair of guard rails.

11. The chute of claim 10, wherein the second end plate includes linear portions interspersed with isosceles triangle shaped portions extending parallel to and spaced from the open entry, and wherein the open entry includes lift loops for removable attachment of lift cables.

12. The chute of claim 5, wherein the receptacle includes a first end plate extending downwardly from the open entry, with the receptacle axis located outside and parallel to the first end plate, a second end plate extending downwardly from the open entry and extending from the open entry at an angle towards the first end plate, and third and fourth, spaced, parallel side plates extending downwardly from the open entry and between the first and second end plates.

13. Chute comprising, in combination:
a casing of a tubular shape having an open top end and an open bottom end;
a first tube having a first end and a second end opposite to the first end, with the open bottom end of the casing received in the first end of the first tube;
a second tube having a third end and a fourth end opposite to the third end, with the second end of the first tube received in the third end of the second tube;
first and second weight basins located on opposite sides of the open top end of the casing, with the first and second weight basins including first and second sockets of an inverted U-shaped cross section;
first and second leverage connectors formed of multiple components connected together contiguously in a serial manner, with the first and second leverage connectors removably connected in the first and second sockets of the first and second weight basins; and
weight blocks removably received in the first and second weight basins, with the first and second leverage connectors removably connected to the casing.

14. The chute of claim 13, further comprising, in combination: a header including third and fourth sockets, with the first and second leverage connectors removably connected in the third and fourth sockets opposite to the first and second weight basins, with the header removably connected to the casing, with the header including an inclined surface at a decreasing angle to horizontal approaching the casing, and with the header further including a pair of guard rails upstanding therefrom and located on opposite sides of the inclined surface.

15. The chute of claim 14, further comprising, in combination: first and second attachment bars, wherein the header includes fifth and sixth sockets located intermediate and parallel to the third and fourth sockets and on opposite sides of the inclined surface; and seventh and eighth sockets connected to the casing, wherein the first and second attachment bars are removably connected in the fifth and seventh sockets and in the sixth and eighth sockets respectively.

16. The chute of claim 15, further comprising, in combination: a screen extending upwardly from the open top end of the casing to a height corresponding to the pair of guard rails.

17. Chute comprising, in combination:
   a casing of a tubular shape having an open top end and an open bottom end;
   a first tube having a first end and a second end opposite to the first end, with the open bottom end of the casing received in the first end of the first tube;
   a second tube having a third end and a fourth end opposite to the third end, with the second end of the first tube received in the third end of the second tube; and
   a header including an inclined surface at a decreasing angle to horizontal approaching the casing, with the header removably connected to the casing, and with the header further including a pair of guard rails upstanding therefrom and located on opposite sides of the inclined surface.

18. The chute of claim 17, further comprising, in combination: first and second attachment bars, wherein the header includes first and second sockets located on opposite sides of the inclined surface, and third and fourth sockets connected to the casing, wherein the first and second attachment bars are removably connected in the first and third sockets and in the second and fourth sockets respectively.

19. The chute of claim 17, wherein the first and second tubes each have a center line extending between the first and second ends and the third and fourth ends, respectively, wherein cross sections of the first and second tubes perpendicular to the center line are rectangular of decreasing size from the first end to the second end and from the third end to the fourth end respectively.

20. The chute of claim 19, further comprising, in combination:
   first flaccid members connected between the casing and the first tube;
   second flaccid members connected between the first flaccid members and the second tube;
   first and second hangers pivotably mounted on opposite sides at the open bottom end of the casing and about a casing axis generally perpendicular to the center line of the first tube, with the first flaccid members connected to the first and second hangers.

21. Chute comprising, in combination:
   a casing of a tubular shape having an open top end and an open bottom end;
   a receptacle of a tubular shape having an open entry and an open exit, wherein the casing is pivotably mounted to the receptacle about a receptacle axis extending perpendicular to the casing axis and a center line of the casing and located outside of the receptacle;
   a first tube having a first end and a second end opposite to the first end, with the open bottom end of the casing received in the first end of the first tube; and
   a second tube having a third end and a fourth end opposite to the third end, with the second end of the first tube received in the third end of the second tube.

\* \* \* \* \*